US012760597B2

(12) United States Patent
Rogan

(10) Patent No.: US 12,760,597 B2
(45) Date of Patent: Oct. 13, 2026

(54) SIDE ACCESS PLATFORM SAFETY GATE

(71) Applicant: Blue Buffalo Enterprises, Inc., Wilton, CT (US)

(72) Inventor: Robert Rogan, Loveland, OH (US)

(73) Assignee: Blue Buffalo Enterprises, Inc., Wilton, CT (US)

( * ) Notice: Subject to any disclaimer, the term of this patent is extended or adjusted under 35 U.S.C. 154(b) by 3 days.

(21) Appl. No.: 19/010,458

(22) Filed: Jan. 6, 2025

(65) Prior Publication Data

US 2026/0193936 A1 Jul. 9, 2026

(51) Int. Cl.
*E06B 11/04* (2006.01)

(52) U.S. Cl.
CPC .................................... *E06B 11/04* (2013.01)

(58) Field of Classification Search
None
See application file for complete search history.

(56) References Cited

U.S. PATENT DOCUMENTS 4,150,510 A * 4/1979 Harrison ................. E06B 11/00 52/64
4,538,379 A * 9/1985 Vargo ....................... E06B 11/00 49/381
5,546,703 A * 8/1996 Conway .................. E06B 11/00 49/203
5,592,779 A * 1/1997 Conway .................. E06B 11/00 49/73.1
5,701,701 A * 12/1997 Desrosiers ................ E05C 1/12 49/73.1
5,709,050 A * 1/1998 Benko ...................... E06B 11/00 49/109
6,212,826 B1 * 4/2001 Kimener ................. E06B 11/00 49/95
6,412,220 B1 * 7/2002 Lindley ................... E06B 11/00 49/40

(Continued)

FOREIGN PATENT DOCUMENTS

CA 3225316 A1 * 1/2023 ............. B65G 1/065
CN 102086723 A 6/2011

(Continued)

OTHER PUBLICATIONS

Egde, “Horizontal Mezzanine Safety Gate”, Retrieved from the Internet: <edgefallprotection.com/products/industrial-safety-gates/horizontal-mezzanine-safety-gate/>, Sep. 9, 2024, 11 pages.

(Continued)

*Primary Examiner* — Catherine A Kelly
(74) *Attorney, Agent, or Firm* — Jordan IP Law, LLC; Annette M. Frawley, Esq.

(57) ABSTRACT

Systems, apparatuses and methods can provide for gate assembly technology that includes a post, a forklift gate coupled to the post via a first connection, wherein the forklift gate is slidable along the first connection between a first closed position and a first open position, and an operator gate coupled to the post via a second connection, wherein the operator gate is rotatable about the second connection between a second closed position and a second open position. The operator gate may be positioned in a substantially perpendicular orientation relative to the forklift gate.

14 Claims, 25 Drawing Sheets

(56) References Cited

U.S. PATENT DOCUMENTS

| | | | | |
|---|---|---|---|---|
| 6,837,296 | B2 * | 1/2005 | Kimener | E06B 11/00 160/113 |
| 7,854,092 | B2 * | 12/2010 | Stoffels | E06B 11/00 49/109 |
| 8,176,677 | B1 * | 5/2012 | Blackmon, III | E06B 11/045 49/404 |
| 8,464,470 | B2 * | 6/2013 | Katagata | E05F 15/643 49/360 |
| 9,556,673 | B2 * | 1/2017 | Stover | E06B 11/00 |
| 10,519,014 | B2 * | 12/2019 | Conway | B66F 11/04 |
| 11,136,800 | B2 * | 10/2021 | Larsen | E06B 11/045 |
| 11,174,605 | B2 * | 11/2021 | Stover | E06B 11/025 |
| 11,274,493 | B2 * | 3/2022 | Craig | E05B 65/0007 |
| 12,404,120 | B2 * | 9/2025 | Ito | B65G 47/90 |
| 12,416,170 | B2 * | 9/2025 | Mirza | E06B 11/022 |
| 2003/0051406 | A1 | 3/2003 | Ritz et al. | |
| 2004/0164288 | A1 * | 8/2004 | Williamson | B65G 1/02 256/73 |
| 2005/0005522 | A1 * | 1/2005 | Benko | E06B 11/00 49/50 |
| 2014/0047769 | A1 * | 2/2014 | Morey | E06B 11/027 49/347 |
| 2019/0078369 | A1 * | 3/2019 | Stover | E06B 9/04 |
| 2024/0271486 | A1 * | 8/2024 | Stover | E06B 11/027 |

FOREIGN PATENT DOCUMENTS

| | | | | |
|---|---|---|---|---|
| EP | 0329535 | A1 | 8/1989 | |
| ES | 2898123 | A2 * | 3/2022 | E04G 21/3233 |
| JP | 2000033885 | A | 2/2000 | |
| JP | 2001146180 | A | 5/2001 | |
| JP | 2004017953 | A | 1/2004 | |
| JP | 6307726 | A | 5/2018 | |

OTHER PUBLICATIONS

Edge, "Self-Closing Safety Gate", Retrieved from the Internet:<edgefallprotection.com/products/industrial-safety-gates/self-closing-safety-gate/>, Sep. 9, 2024, 10 pages.

Safemezz, "Horizontal gate", Retrieved from the Internet: <pssafetyaccess.com/product/safemezz-horizontal-gate/>, Sep. 9, 2024, 4 pages.

Rack Systems Inc. Safety Gates (Pivot), Retrieved from the Internet: <racksystemsinc.com/safety-products/safety-gates/>, Sep. 9, 2024, 6 pages.

Kee Safety, "Kee Gate Self-Closing Safety Gate", Retrieved from the Internet: <keesafety.in/safety-gates/kee-gate?gad_source=1&gclid=CjwKCAjwreW2BhBhEiwAavLwfOQCTsUlzydc-i93A5CpsXbDOQXEh2bAMA_RUjazLUNMyC10jncmFxoCxDsQAvD_BwE>, Sep. 9, 2024, 11 pages.

PS Industries, "EdgeSafe Smart Gate Electric Operator Kit", Retrieved from the Internet: <psindustries.com/product/edgesafe-smart-gate-electric-operator/>, Sep. 9, 2024, 3 pages.

Ballymore Safety Products, "U-Gate Self-Closing Safety Gate", Retrieved from the Internet: <ballymore.com/u-gate-self-closing-safety-gate/>, Sep. 9, 2024, 4 pages.

* cited by examiner

SIDE ACCESS PLATFORM SAFETY GATE

TECHNICAL FIELD

Embodiments generally pertain to safety gates. More particularly, embodiments pertain to side access platform safety gates.

BACKGROUND

Elevated workstations can be used in a variety of environments. For example, palletized raw materials might be loaded onto an elevated platform by a forklift in a food processing environment, wherein personnel standing on the platform may load the raw materials into bins and/or hoppers for further processing. To prevent safety hazards (e.g., personnel stepping or falling off the platform), a gate may be installed at the edge of the platform. Conventional safety gates, however, may present ergonomic challenges to the personnel.

SUMMARY

In one embodiment, a gate assembly comprises a post, a forklift gate coupled to the post via a first connection, wherein the forklift gate is slidable along the first connection between a first closed position and a first open position, and an operator gate coupled to the post via a second connection, wherein the operator gate is rotatable about the second connection between a second closed position and a second open position.

In another embodiment, a workstation comprises a platform, a plurality of bins coupled to the platform, and a plurality of gate assemblies coupled to the platform, wherein each gate assembly is positioned adjacent to one of the plurality of bins, and wherein each gate assembly comprises a post, a forklift gate coupled to the post via a first connection, wherein the forklift gate is slidable along the first connection between a first closed position and a first open position, and an operator gate coupled to the post via a second connection, wherein the operator gate is rotatable about the second connection between a second closed position and a second open position.

In yet another embodiment, a method of manufacturing a gate assembly comprises providing a post, coupling a forklift gate to the post via a first connection, wherein the forklift gate is slidable along the first connection between a first closed position and a first open position, and coupling an operator gate to the post via a second connection, wherein the operator gate is rotatable about the second connection between a second closed position and a second open position.

BRIEF DESCRIPTION OF THE DRAWINGS

The various advantages of the embodiments will become apparent to one skilled in the art by reading the following specification and appended claims, and by referencing the following drawings, in which.

DETAILED DESCRIPTION OF EMBODIMENTS

Figure 1:
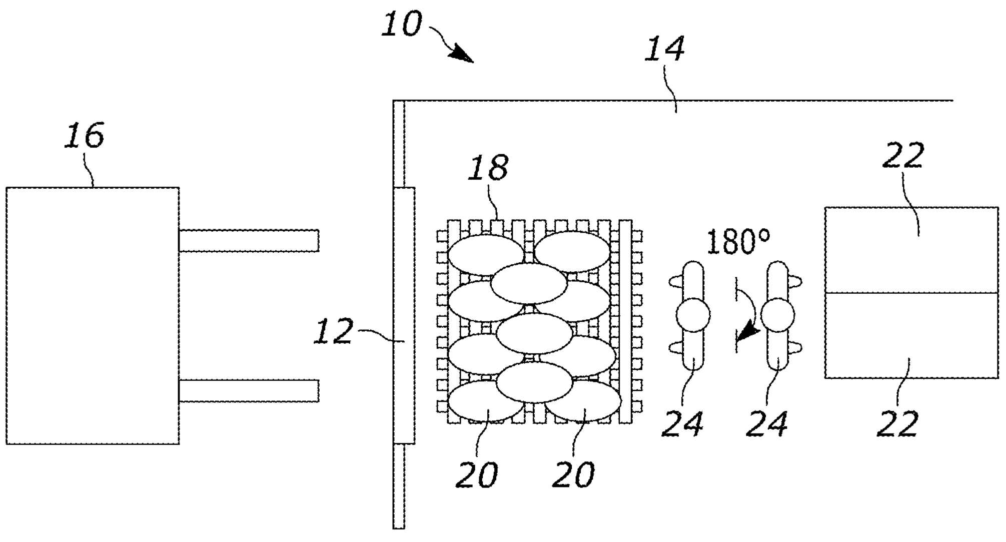
PRIOR ART FIG. 1
FIG. 1 is a plan view of an example of a conventional elevated workstation.

The following detailed description should be read with reference to the drawings in which similar elements in different figures are numbered the same. The detailed description and the drawings, which are not necessarily to scale, set forth illustrative and exemplary embodiments and are not intended to limit the scope of the disclosure. Selected features of any illustrative embodiment can be incorporated into an additional embodiment unless clearly stated to the contrary. While the disclosure is amenable to various modifications and alternative forms, specifics thereof have been shown by way of example in the drawings and will be described in detail. Overall, it should be understood, however, that the intention is not to limit aspects of the disclosure to the particular illustrative embodiments described. On the contrary, the intention is to cover all modifications, equivalents, and alternatives falling within the spirit and scope of the disclosure.

Figure 1A:
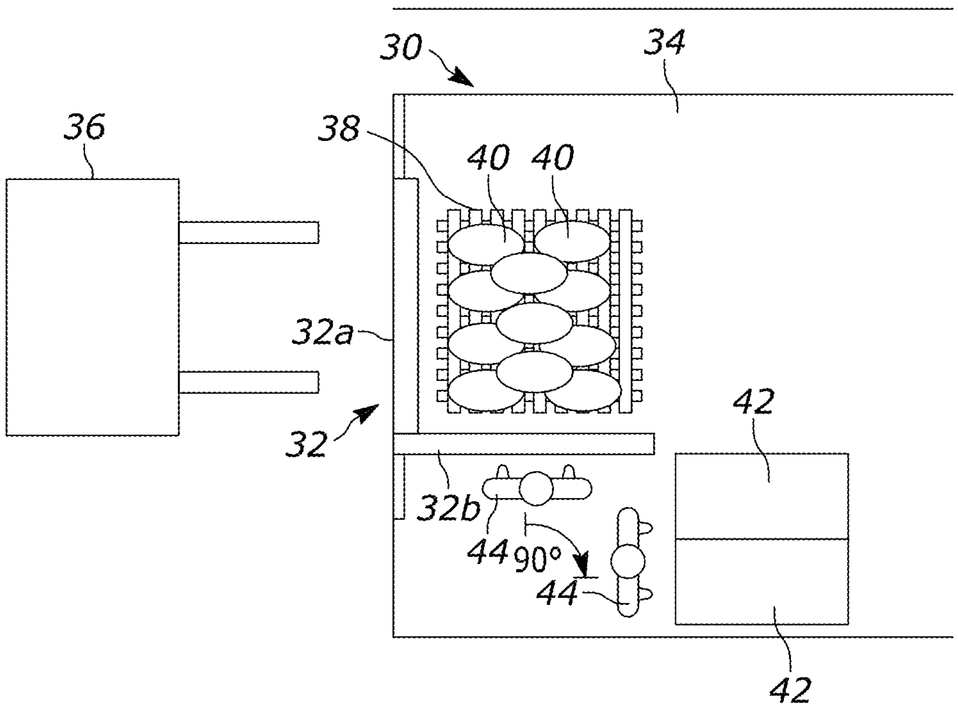
FIG. 1A is a plan view of an example of an enhanced elevated workstation according to an embodiment.

Turning now to FIG. 1A, a plan view of a conventional elevated workstation 10 is shown in which a safety gate 12 is installed near or at the edge of a platform 14. The safety gate 12 may be opened to permit a forklift 16 (e.g., located on the ground/floor) to move a pallet 18 from the floor up and onto the platform 14. After the pallet 18 is placed onto the platform 14, the safety gate 12 may be closed to prevent an individual 24 from stepping or falling off the platform 14. The illustrated pallet 18 contains materials 20 (e.g., minor ingredients in a food processing environment) to be placed by the individual 24 into one or more bins 22 (e.g., hoppers). The process of transferring the materials 20 into the bin(s) 22 involves the individual 24 repeatedly turning 180°, which can place ergonomic stress on the body of the individual 24.

By contrast, an enhanced elevated workstation 30 according to the technology described herein includes a gate assembly 32 (32*a*, 32*b*) having a forklift gate 32*a* installed at the edge of a platform 34 and an operator gate 32*b* positioned in a substantially perpendicular orientation to the forklift gate 32*a* (e.g., providing side access). As will be discussed in greater detail, the forklift gate 32*a* is slidable along a first connection (e.g., a roller-to-rail interface) between a first closed position (as shown) and a first open position. Additionally, the operator gate 32*b* is rotatable about a second connection (e.g., pin providing a pivot point) between a second closed position (as shown) and a second open position.

Therefore, the forklift gate 32*a* can be opened (e.g., moved to the first open position) to permit a forklift 36 (e.g., located on the ground/floor) to move a pallet 38 from the floor up and onto the platform 34. During the placement of the pallet 38 onto the platform 34, the operator gate 32*b* is closed (e.g., maintained in the second closed position) to prevent an individual 44 from stepping or falling off the platform 34. The illustrated pallet 38 contains materials 40 (e.g., minor ingredients in a food processing environment) to be placed by the individual 44 into one or more bins 42 (e.g., hoppers). Once the pallet 38 has been placed onto the platform 38, the forklift gate 32*a* is closed (e.g., moved back to the first closed position) and the operator gate 32*b* is opened (e.g., rotated upwards to the second open position). The process of transferring the materials 40 into the bin(s) 42 involves the individual 44 repeatedly turning 90°, which places less ergonomic stress on the body of the individual 44.

Figure 1B:
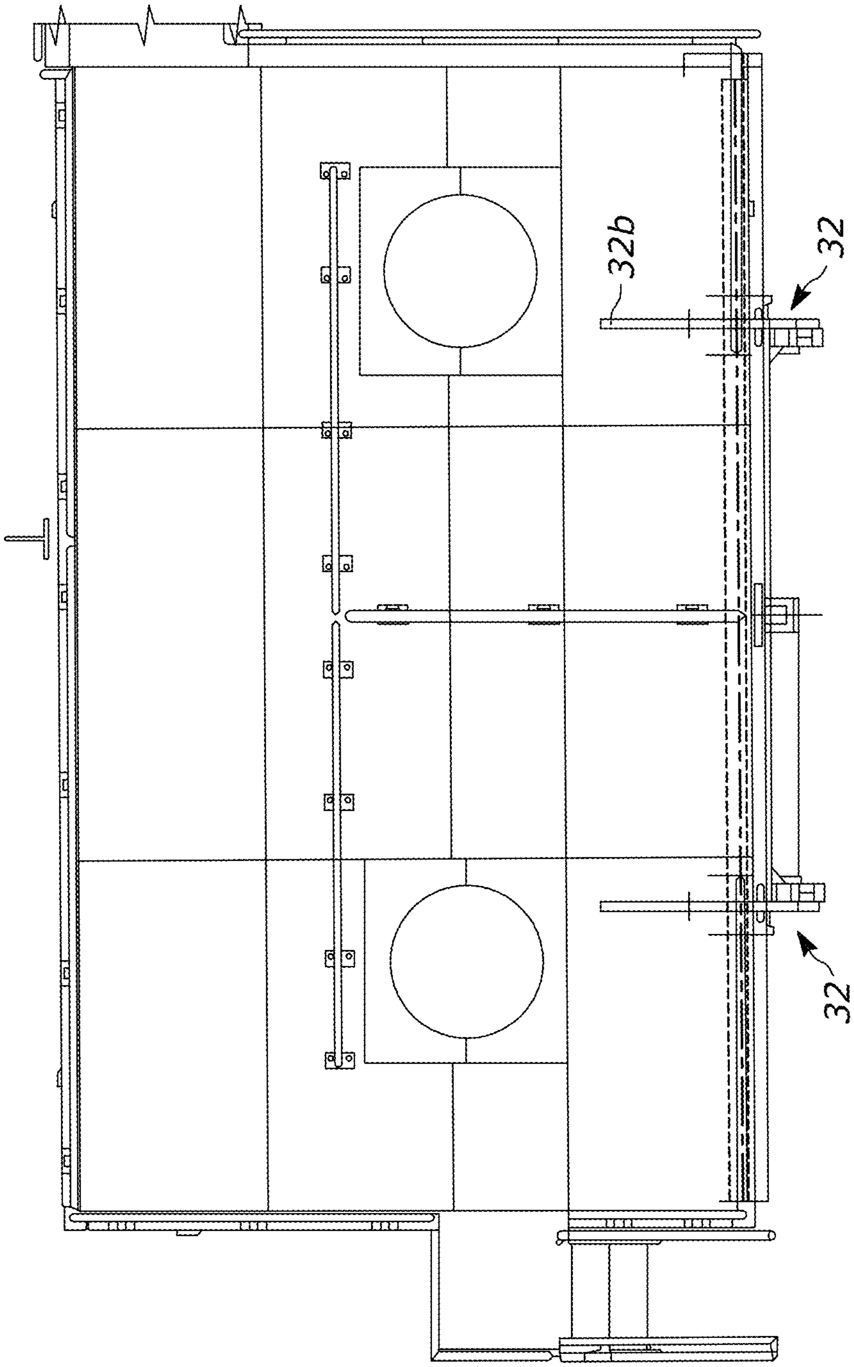
FIG. 1B is a plan view of an example of a plurality of gate assemblies according to an embodiment.
Figure 1C:
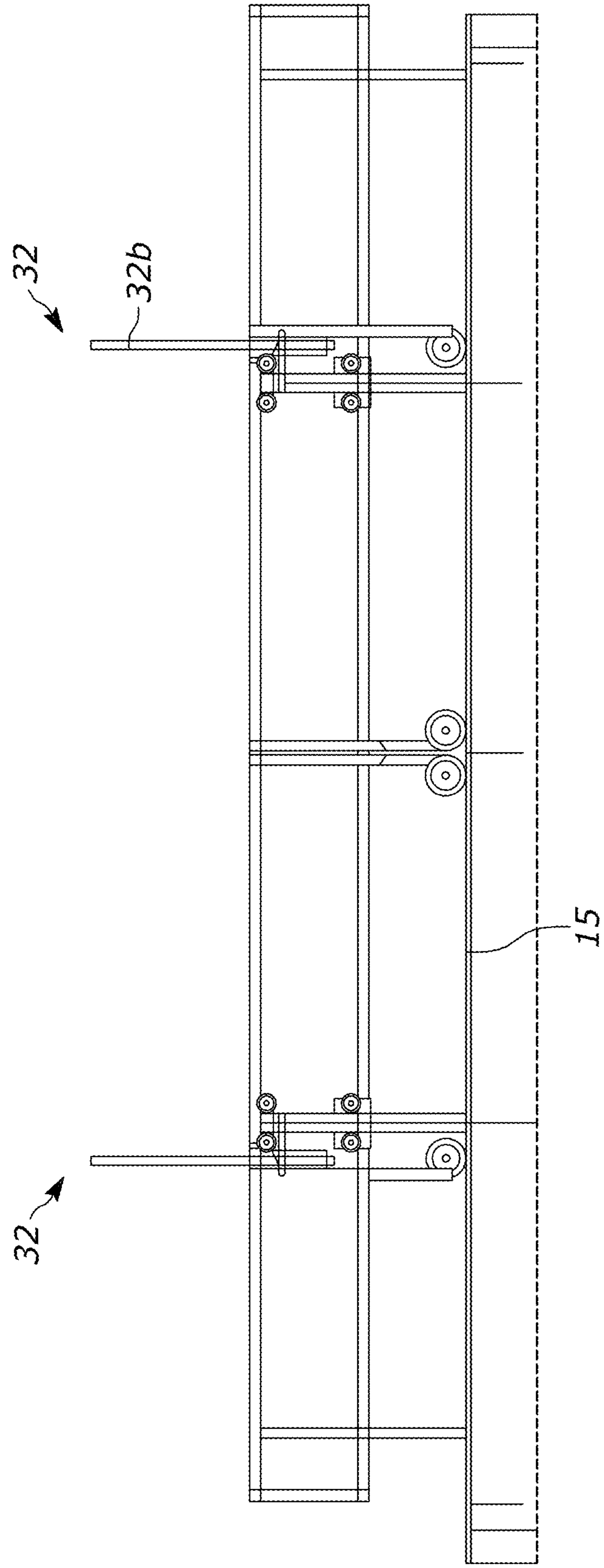
FIG. 1C is a front view of an example of the plurality of gate assemblies in FIG. 1B.
Figure 1D:
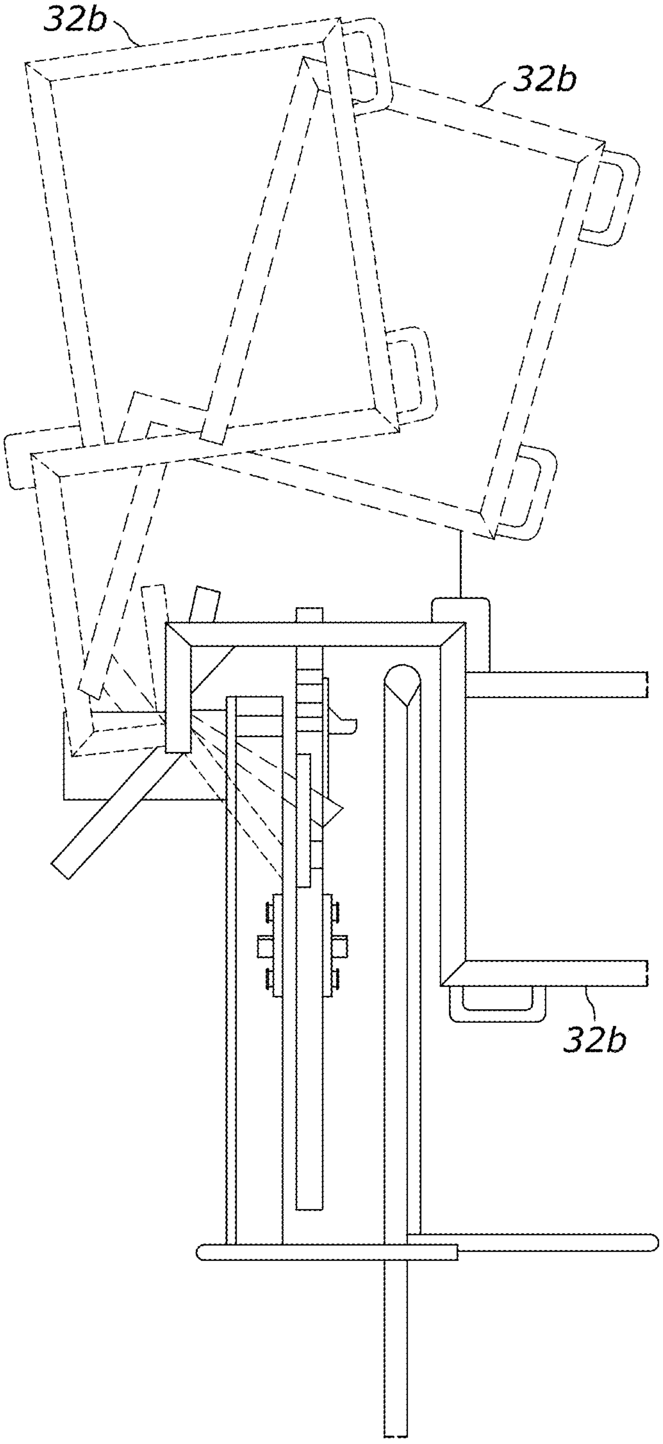
FIG. 1D is a side view of an example of an operator gate transitioning between an open position and a closed position according to an embodiment.

Turning now to FIGS. 1B-1D, a plurality of gate assemblies 32 are installed next to one another (e.g., in a mirrored arrangement) on a shared platform 15. The mirrored arrangement of the gate assemblies 32 enables the size of the platform 15 to be minimized. As best shown in FIG. 1D, the operator gate 32*b* transitions between a closed position (e.g., down) and an open position (e.g., up) during operation.

Figure 2:
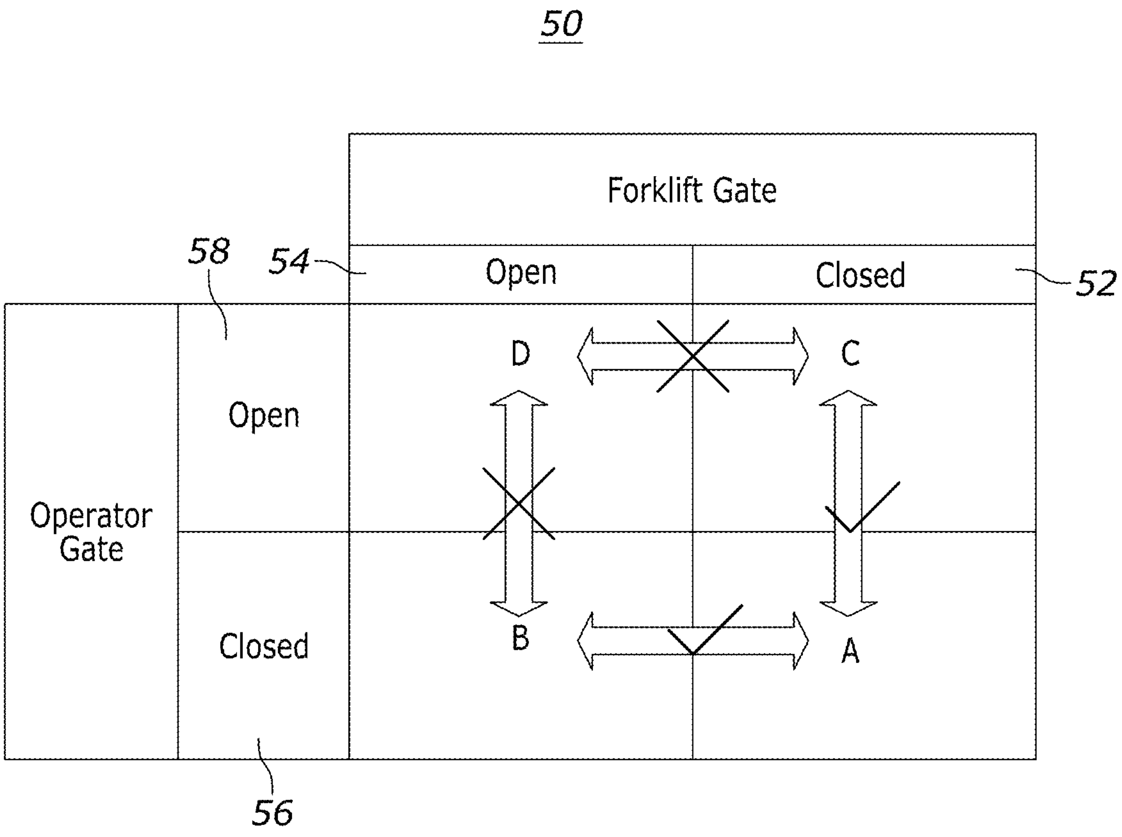
FIG. 2 is an illustration of an example of a gate assembly truth table according to an embodiment.

FIG. 2 shows a truth table 50 for the first closed position 52 and the first open position 54 of the forklift (e.g., front) gate in relation to the second closed position 56 and the second open position 58 of the operator (e.g., side) gate. The truth table 50 demonstrates that when the forklift gate is in the first closed position 52 and the operator gate is in the second closed position 56 (e.g., state "A"), a transition of the forklift gate to the first open position (e.g., state "B") is permitted. Similarly, when the forklift gate is in the first closed position 52 and the operator gate is in the second closed position 56 (e.g., state "A"), a transition of the operator gate to the second open position (e.g., state "C") is permitted. By contrast, when the gate assembly is in state B, a transition of the operator gate to second open position 58 (e.g., state "D", both gates open) is prevented. As will be discussed in greater detail, transitions from state B to state D are prevented by interference between a horizontal bar of the forklift gate and a first extension of the operator gate. Additionally, when the gate assembly is in state C, a transition of the forklift gate to the first open position 54 (e.g., state "D", both gates open) is prevented. As will be discussed in greater detail, transitions from state C to state D are prevented by interference between a loop of the forklift gate and a second extension of the operator gate.

Figure 3A:
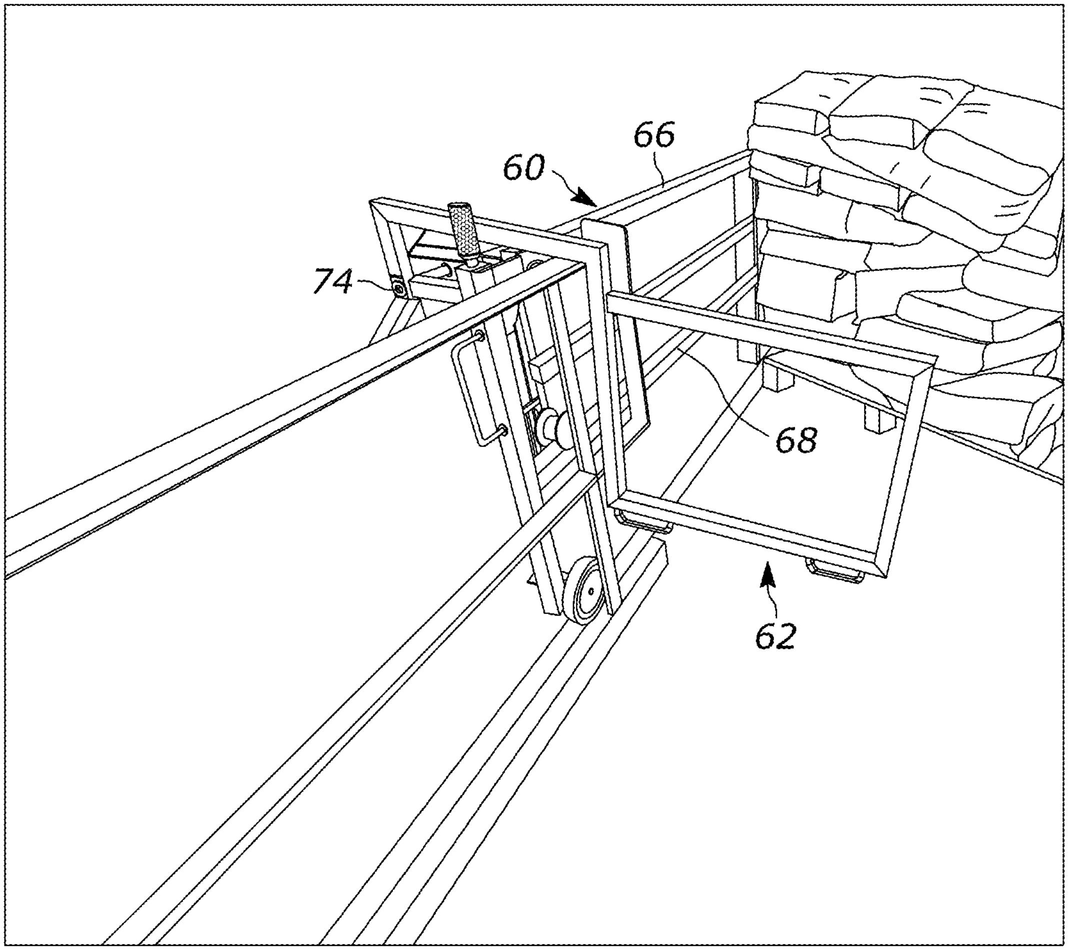
FIGS. 3A-3F are perspective views of examples of a gate assembly having a forklift gate and an operator gate in a closed position according to an embodiment.
Figure 3B:
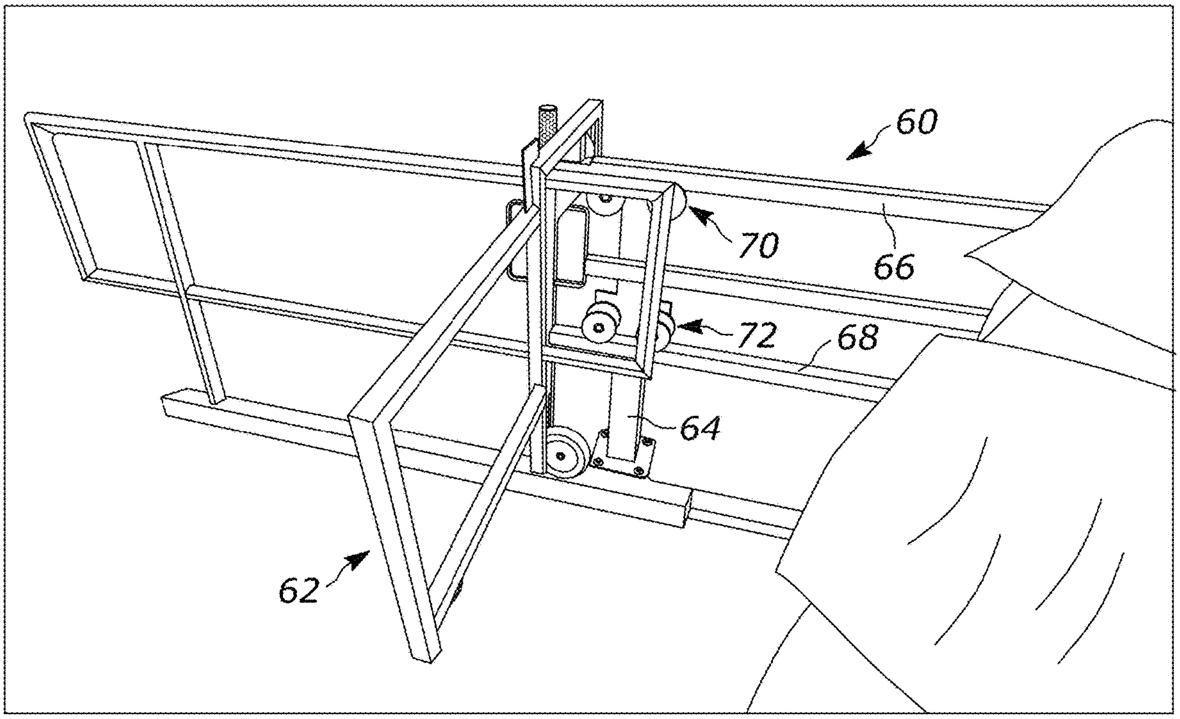
Figure 3C:
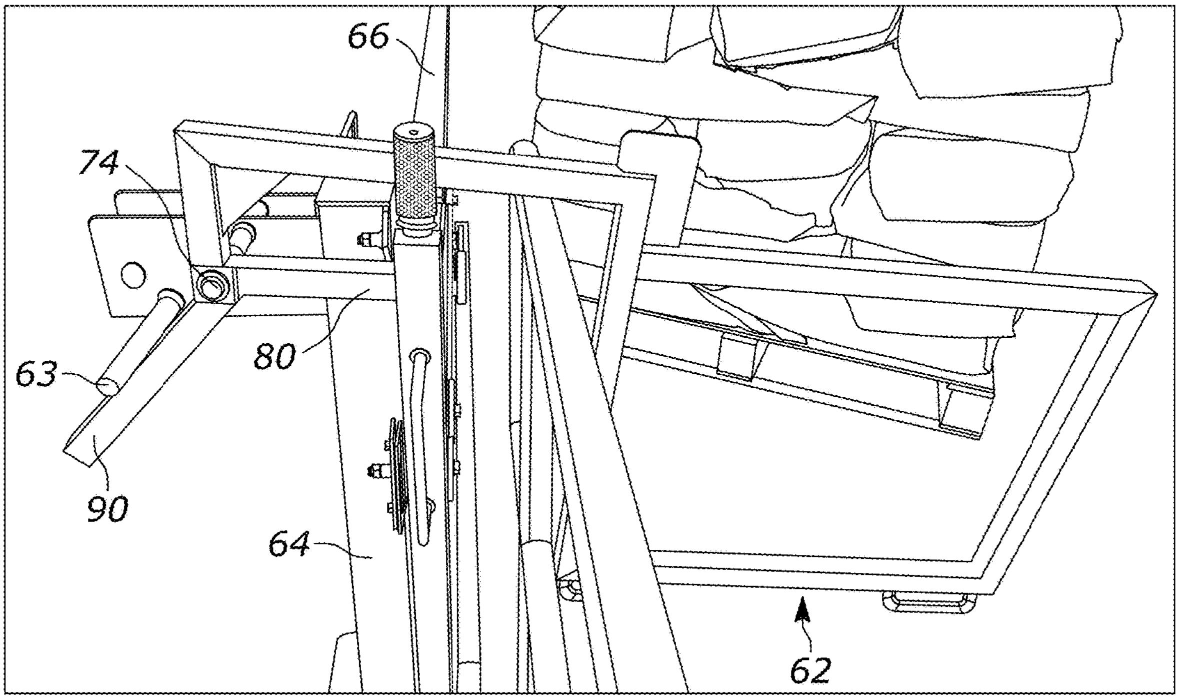
Figure 3D:
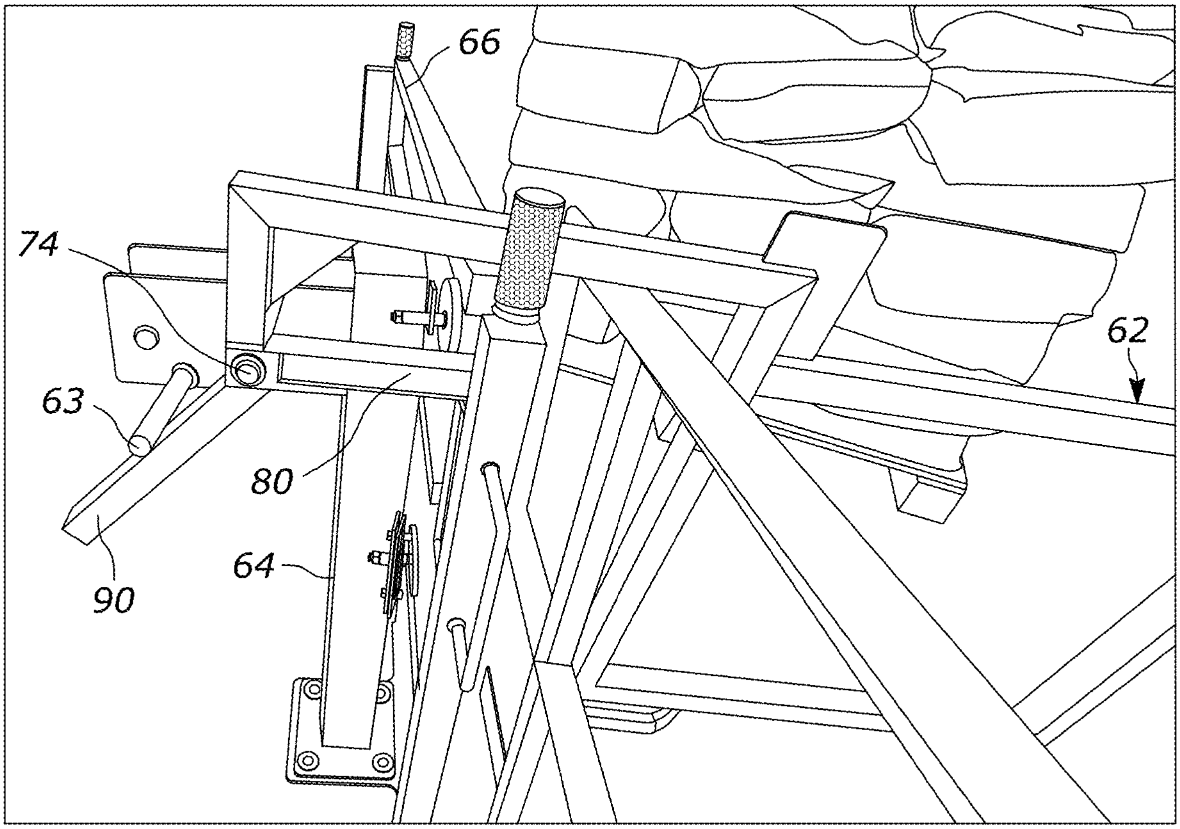
Figure 3E:
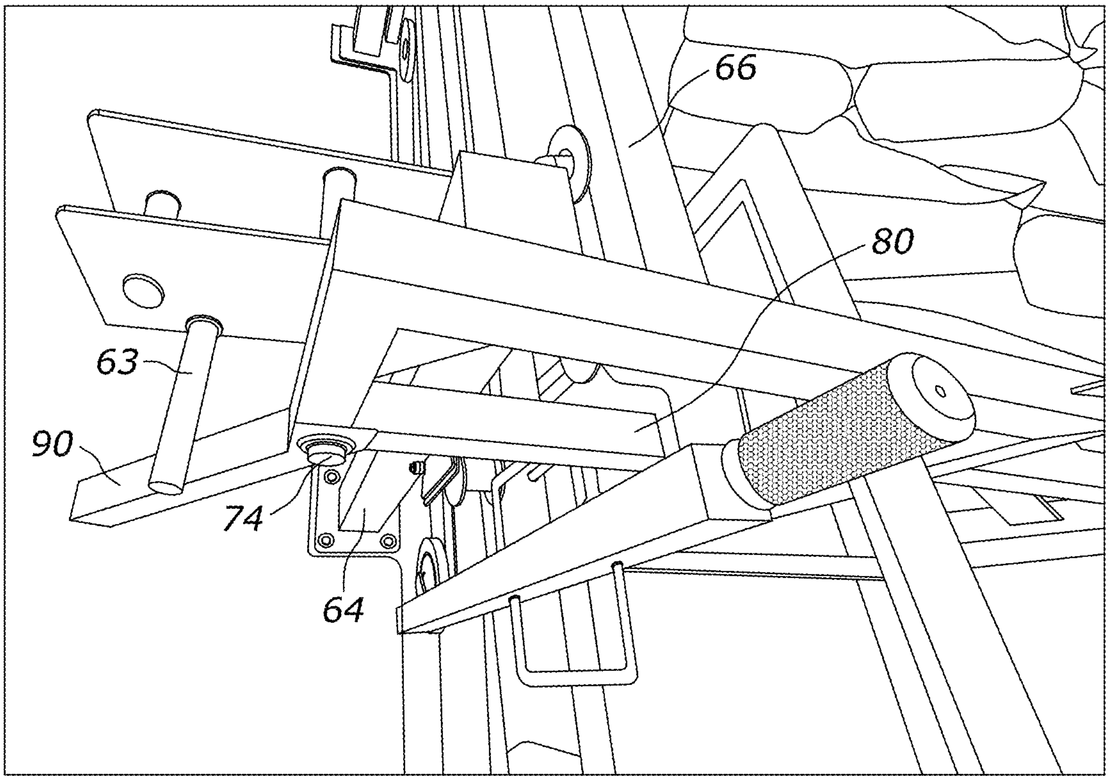
Figure 3F:
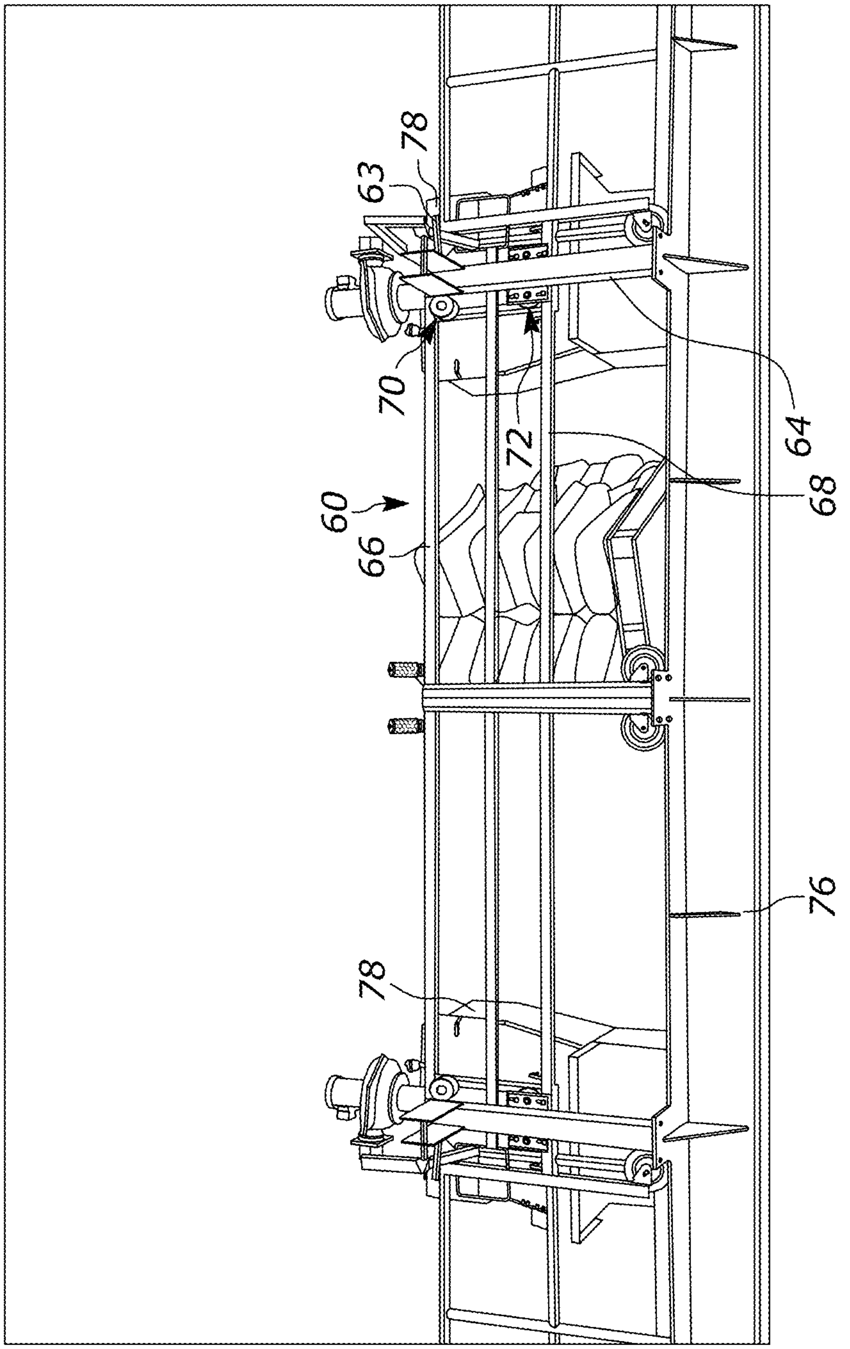

Turning now to FIGS. 3A-3F, various perspective views of a gate assembly are shown in which a forklift gate 60 and an operator gate 62 are closed (e.g., first and second closed positions). As best shown in FIGS. 3B and 3F, the gate assembly includes a post 64, wherein the forklift gate 60 is coupled to the post 64 via a first connection. In the illustrated example, the forklift gate 60 includes a first horizontal bar 66 and a second horizontal bar 68, wherein the first connection includes a first plurality of rollers 70 contacting a bottom of the first horizontal bar 66 and a second plurality of rollers 72 contacting a top of the second horizontal bar 68. Accordingly, the forklift gate 60 is slidable along the first connection between a first closed position (as shown) and a first open position.

As best shown in FIGS. 3C-3E, the operator gate 62 is coupled to the post 64 via a second connection, wherein the operator gate 62 is rotatable about the second connection between a second closed position (as shown) and a second open position. In the illustrated example, the second connection includes a pin 74, although any pivot point structure may be used. The operator gate 62 is positioned in a substantially perpendicular orientation relative to the forklift gate 60 (e.g., providing side access). As best shown in FIG. 3F, the elevated workstation may include a platform 76, a plurality of bins 78 coupled to the platform 76 and a plurality of gate assemblies coupled to the platform 76, wherein each gate assembly is positioned adjacent to one of the plurality of bins 78. As already noted, the mirrored arrangement of the gate assemblies enables the size of the platform 76 to be minimized.

As best shown in FIGS. 3C-3E, the operator gate 62 may include a first extension 80 and a second extension 90. As will be discussed in greater detail, the first extension 80 uses physical interference with the forklift gate 60 to prevent the operator gate 62 from being opened while the forklift gate 60 is open and the second extension 90 uses physical interference with the forklift gate 60 to prevent the forklift gate 60 from being opened while the operator gate 62 is open. In an embodiment, the second extension 90 is slightly longer than the first extension 80. The operator gate 62 may be constructed of a relatively lightweight material such as aluminum to facilitate lifting of the operator gate 62 by personnel. Additionally, contact between a protrusion 63 from the post 64 and the second extension 90 may prevent the operator gate 62 from contacting the platform 76.

Figure 4A:
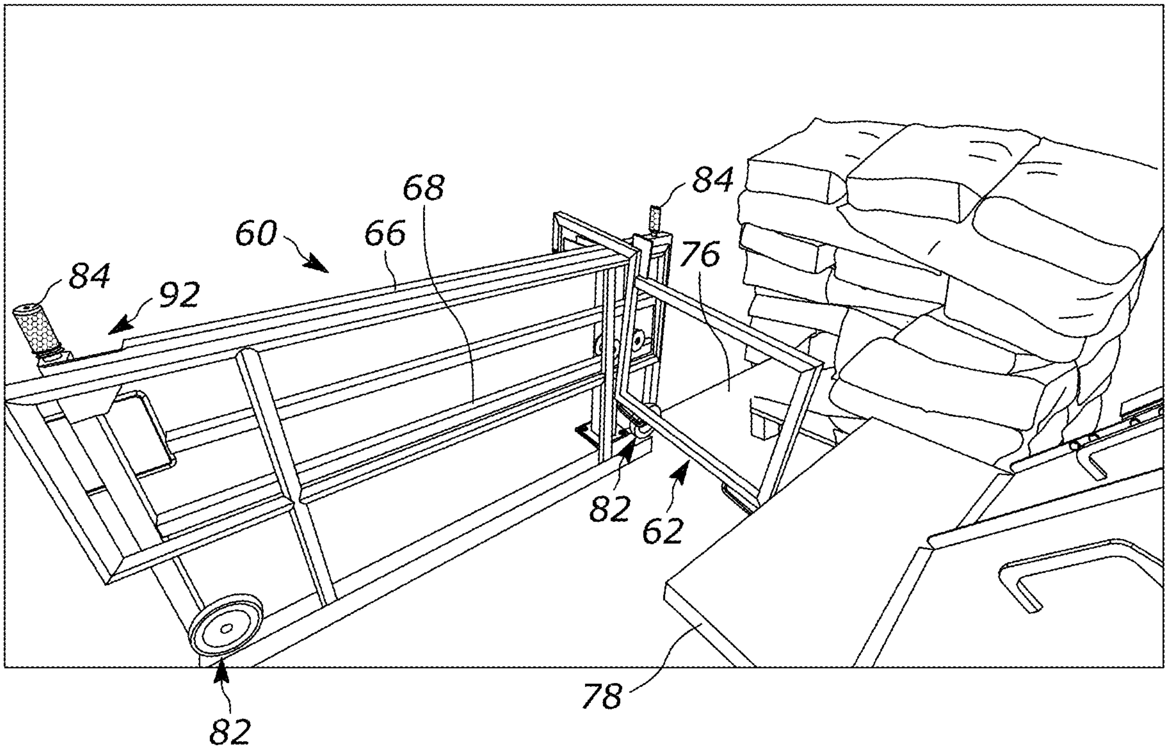
FIGS. 4A-4F are perspective views of examples of a gate assembly having a forklift gate in an open position and an operator gate in a closed position according to an embodiment.
Figure 4B:
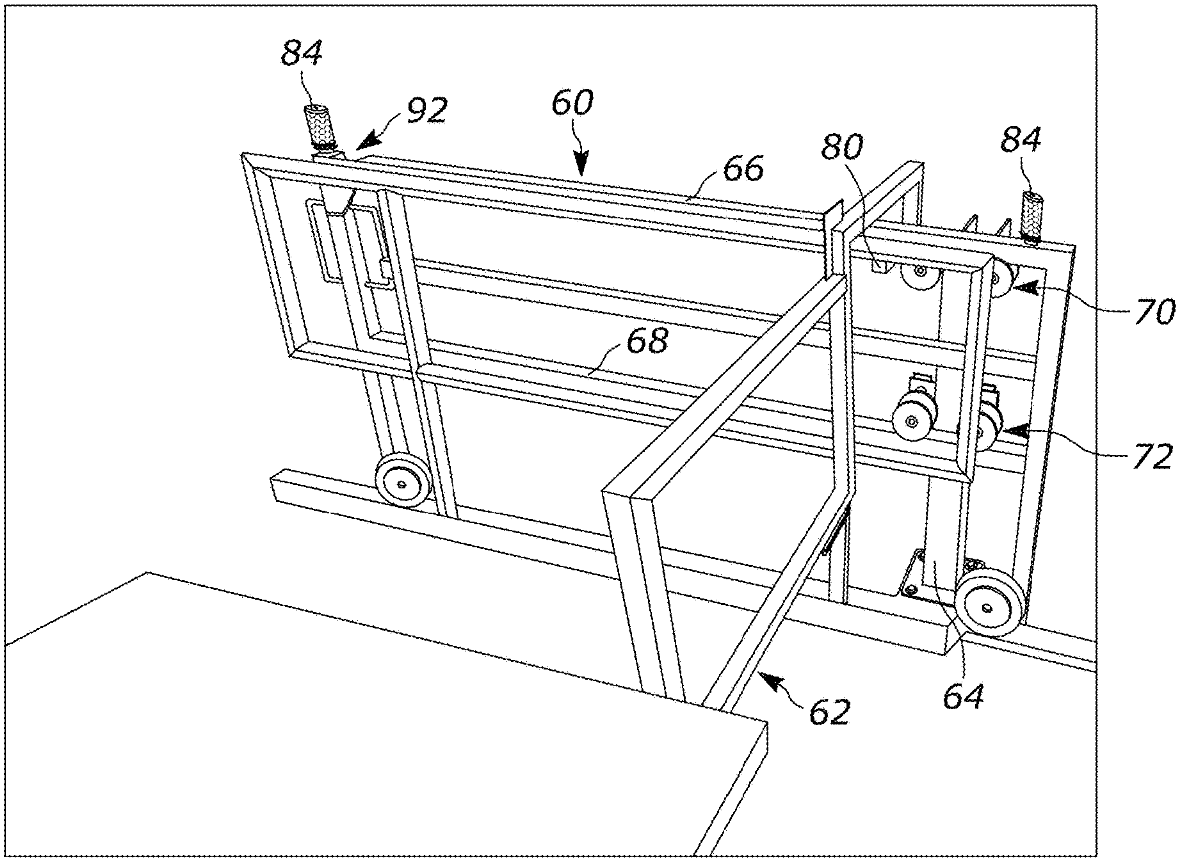
Figure 4C:
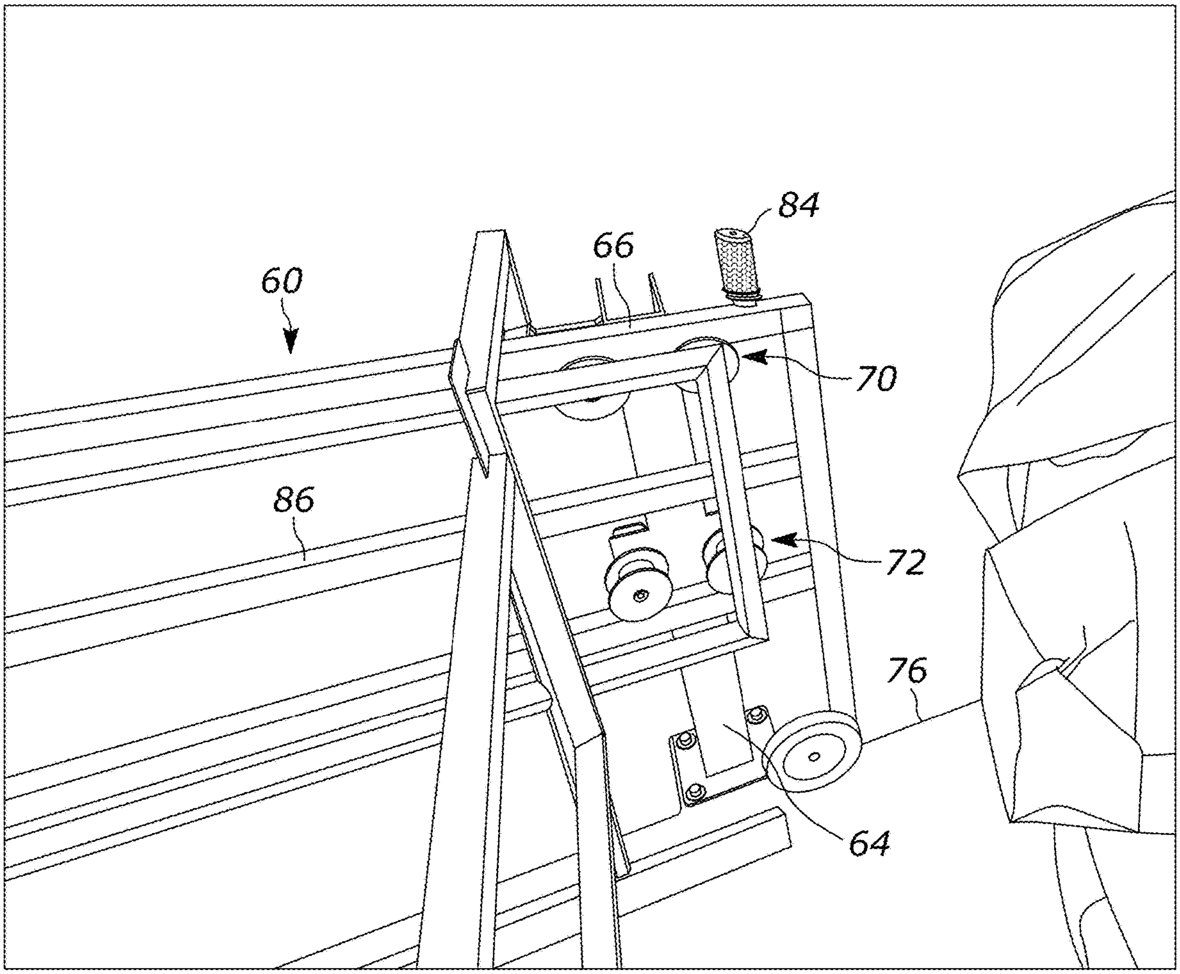
Figure 4D:
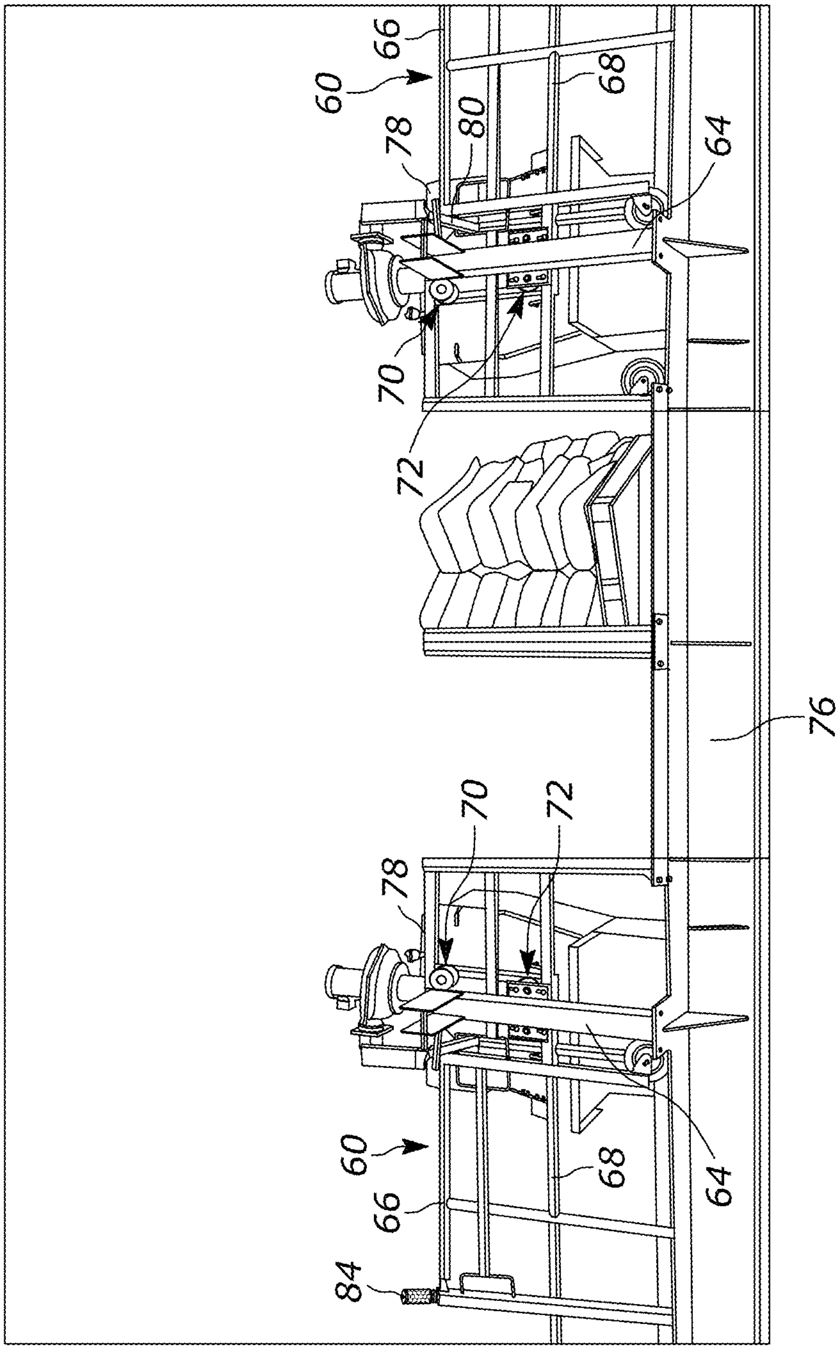
Figure 4E:
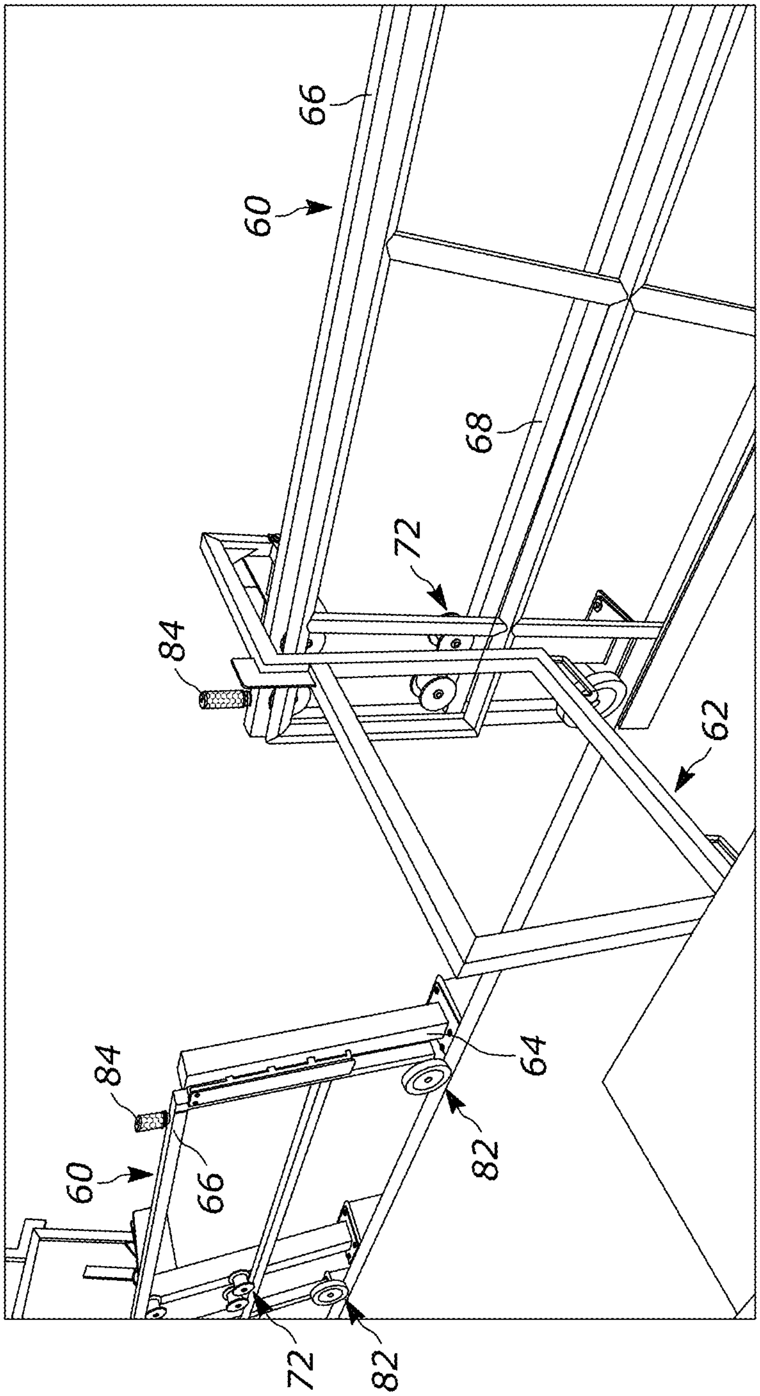
Figure 4F:
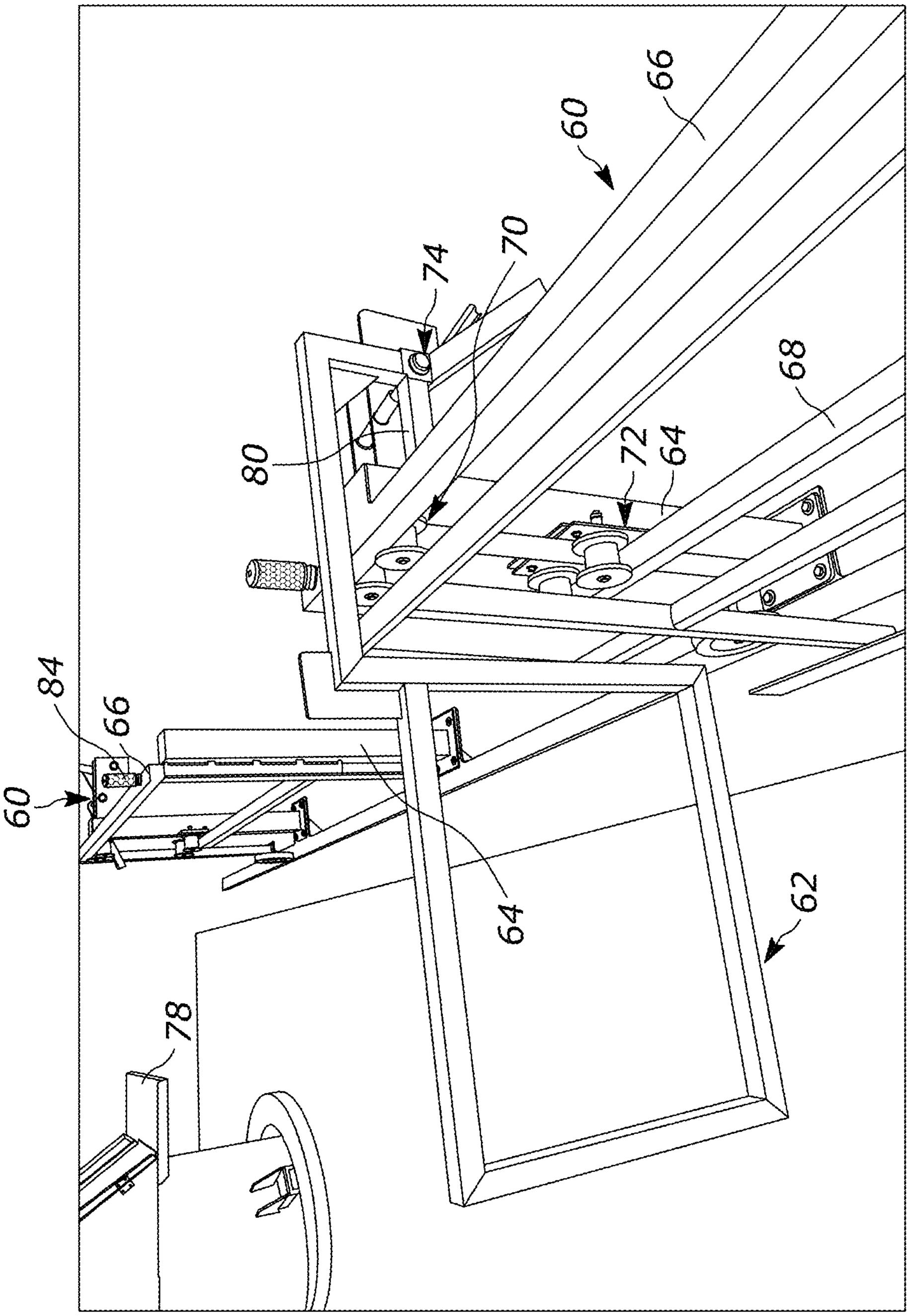

FIGS. 4A-4F show various perspective views of the gate assembly when the forklift gate 60 is open (e.g., first open position) and the operator gate 62 is closed (e.g., second closed position). The forklift gate 60 may include one or more handles 84 protruding from the top of the forklift gate 60 to facilitate sliding (e.g., by an individual) of the forklift gate 60 between the first closed position and the first open position. As best shown in FIGS. 4D and 4F, the operator gate 62 includes the first extension 80, wherein interference between the first horizontal bar 66 and the first extension 80 prevents the operator gate 62 from rotating from the second closed position to the second open position while the forklift gate 60 is in the first open position. Thus, as long as the operator gate 62 is closed, personnel may freely slide the forklift gate 60 between the first open and first closed positions as needed. As best shown in FIGS. 4A and 4B, a notch 92 provides clearance for the first extension 80 to pass through after the forklift gate 60 has been moved to the first closed position. As best shown in FIGS. 4A, the forklift gate 60 may also include a plurality of wheels 82 to contact the platform 76 and facilitate opening and closing of the forklift gate 60. In one example, the wheels 82 are sized to support the weight of the forklift gate 60. FIGS. 4E and 4F demonstrate that the third horizontal bar 86 may alternatively be omitted from the forklift gate 60.

Figure 5A:
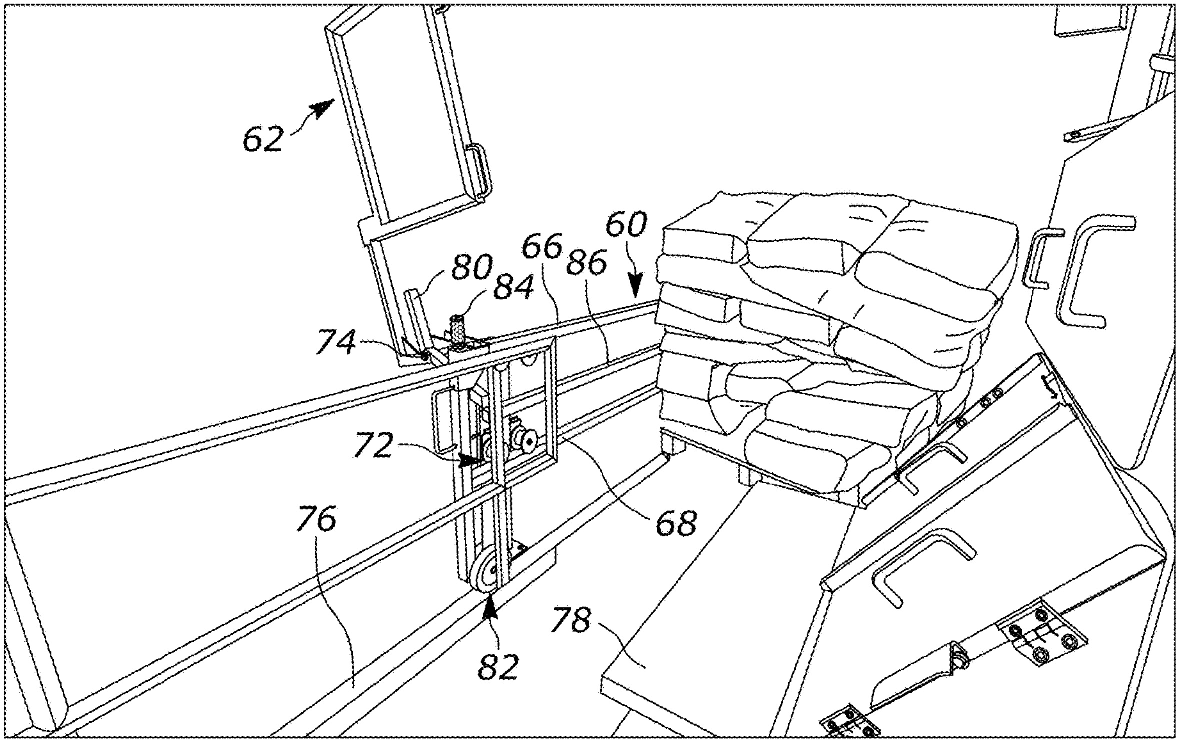
FIGS. 5A-5G are perspective views of examples of a gate assembly having a forklift gate in a closed position and an operator gate in an open position according to an embodiment.
Figure 5B:
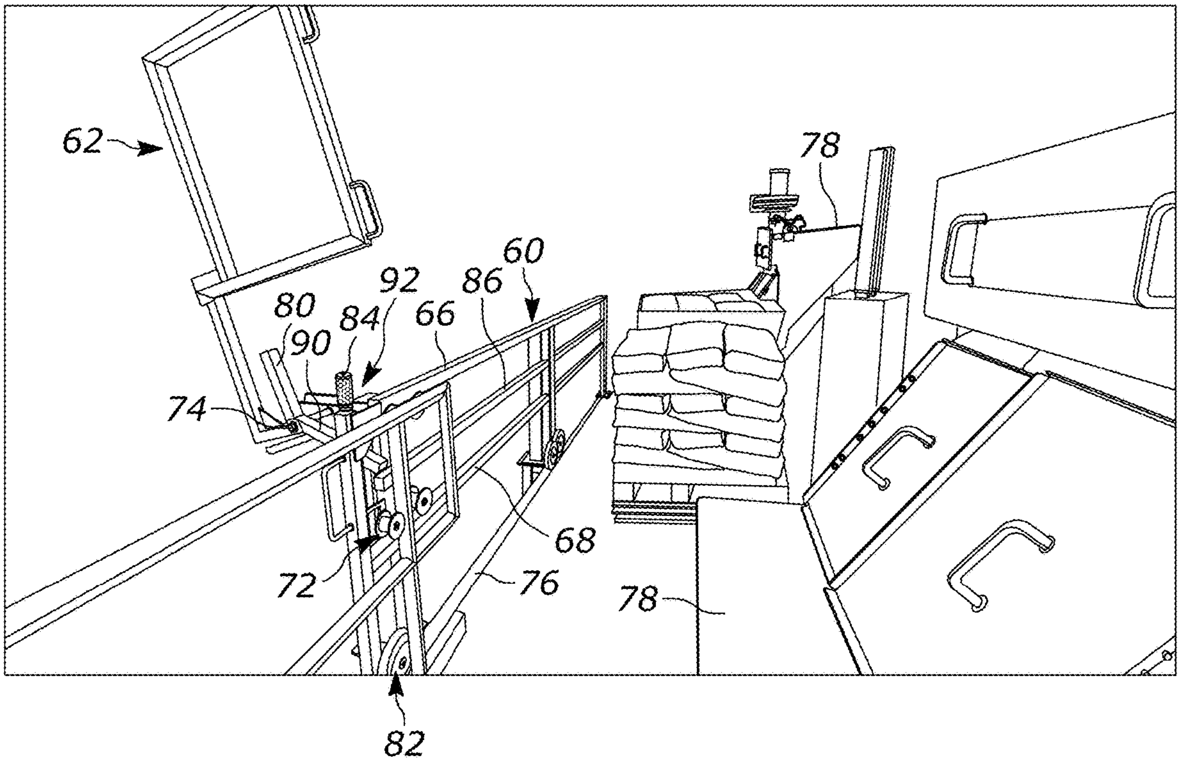
Figure 5C:
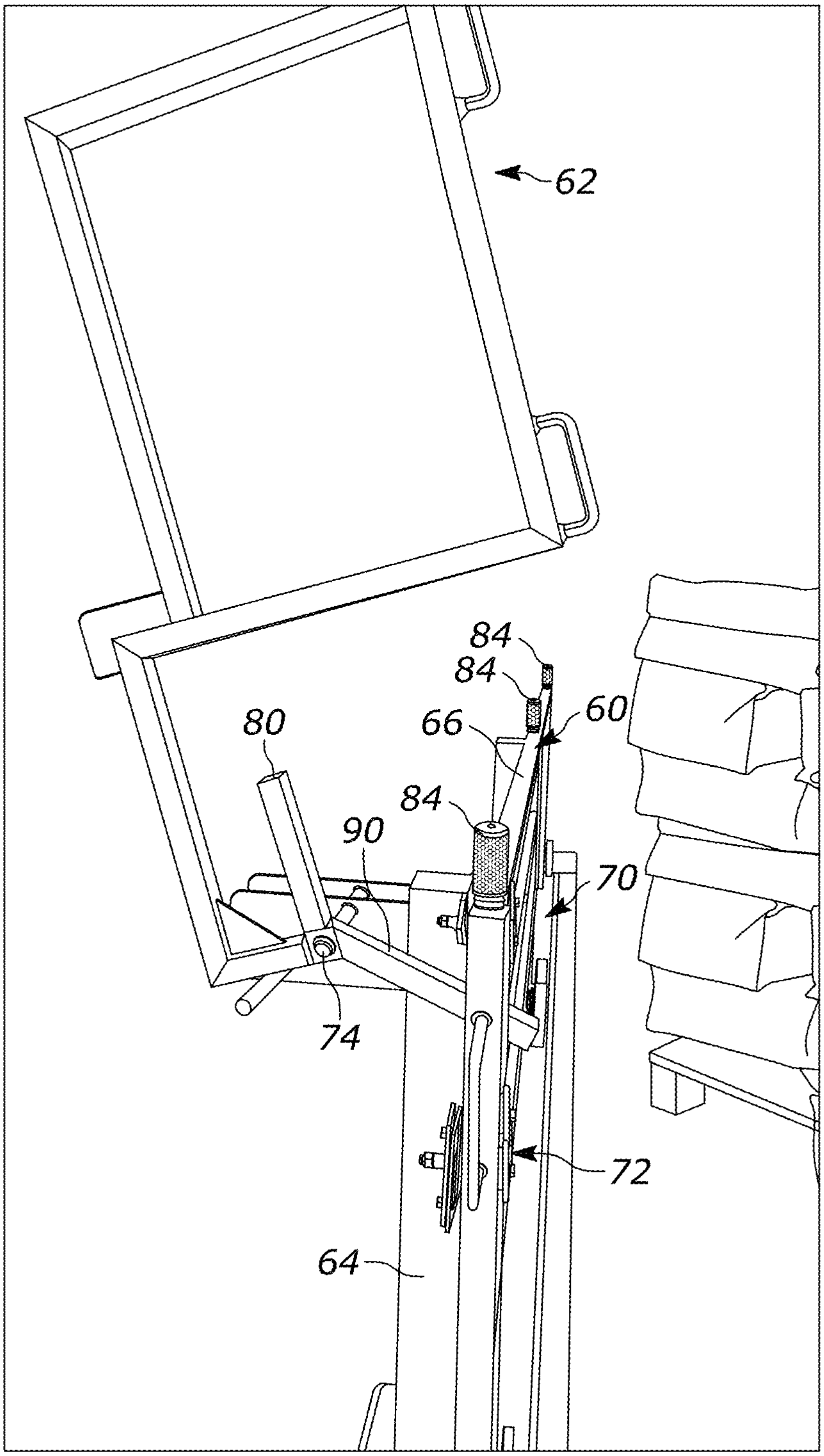
Figure 5D:
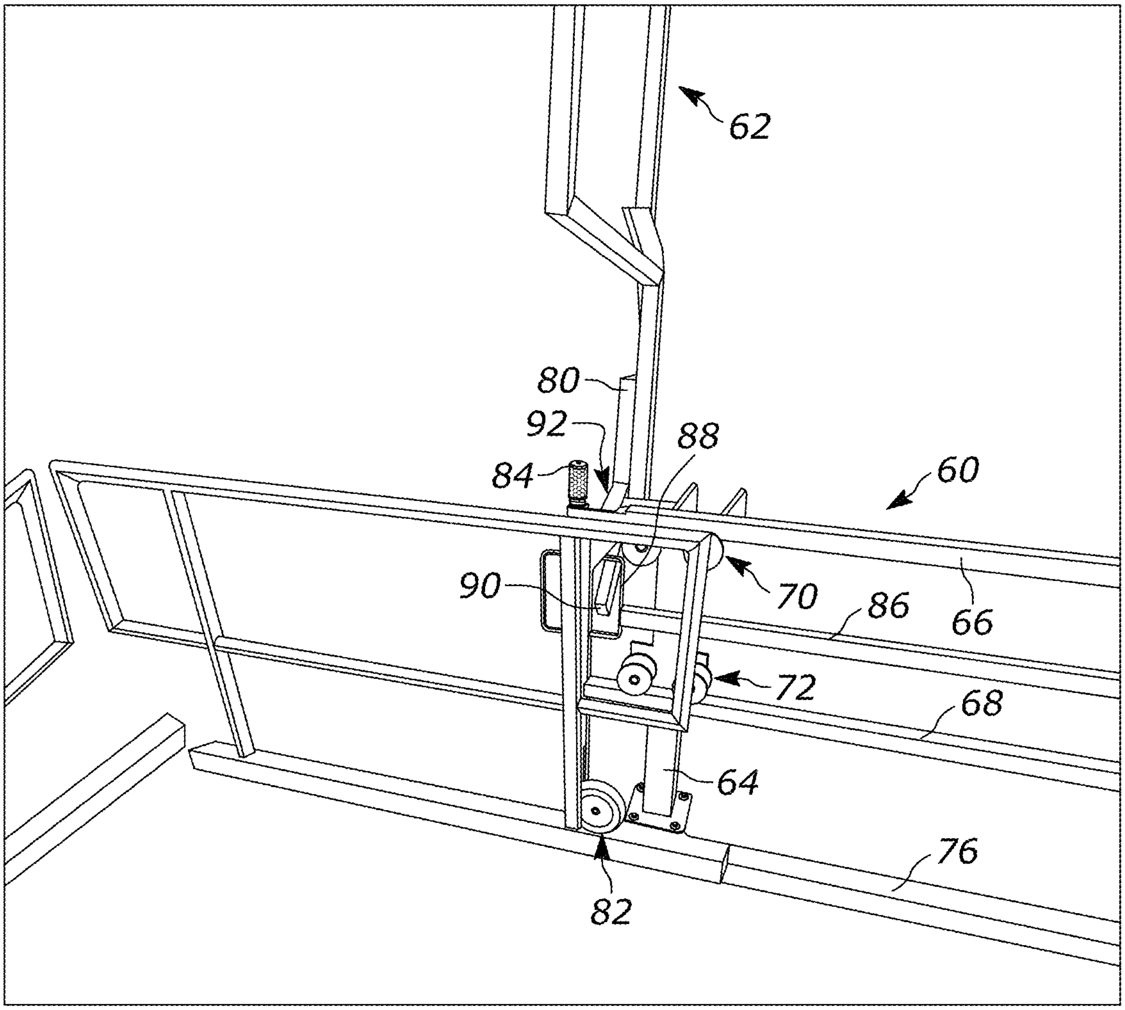
Figure 5E:
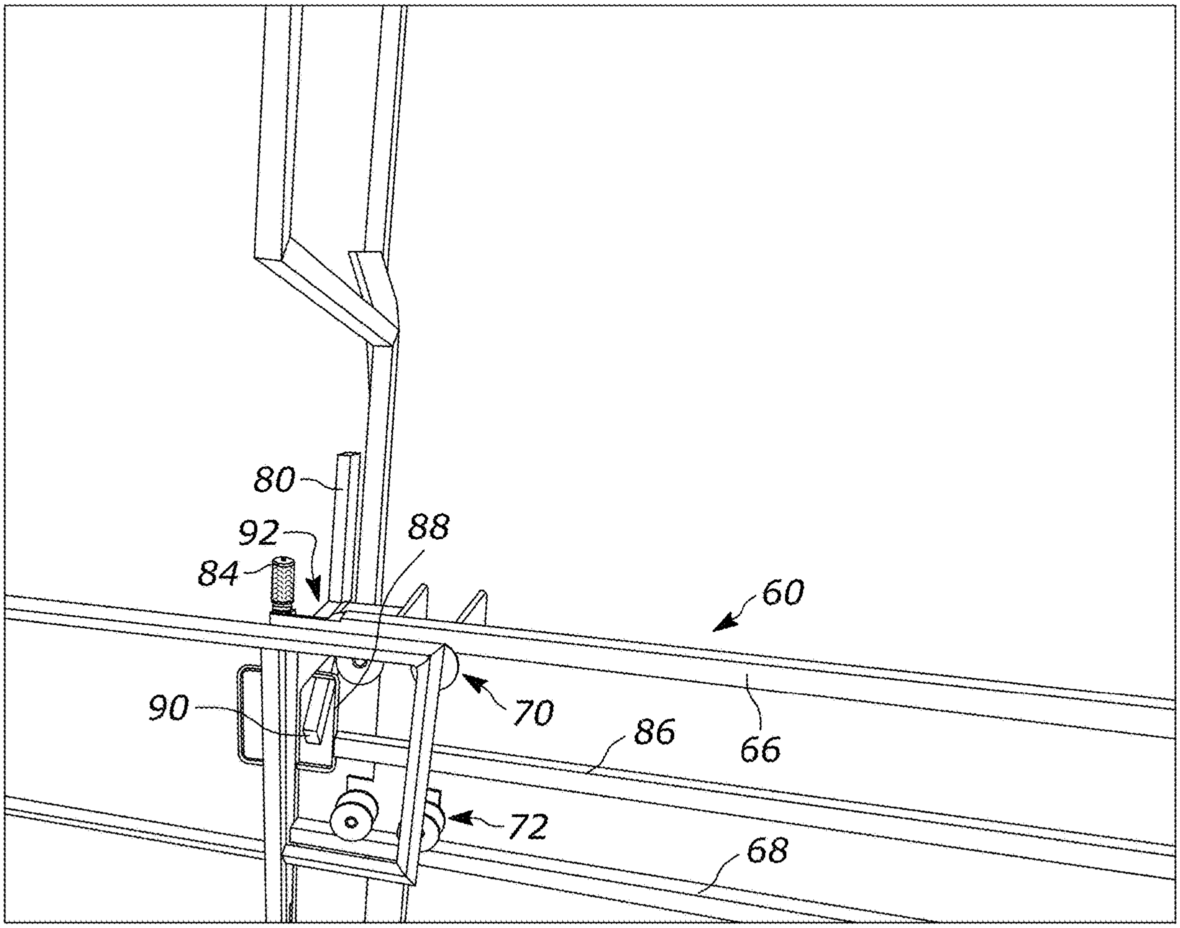
Figure 5F:
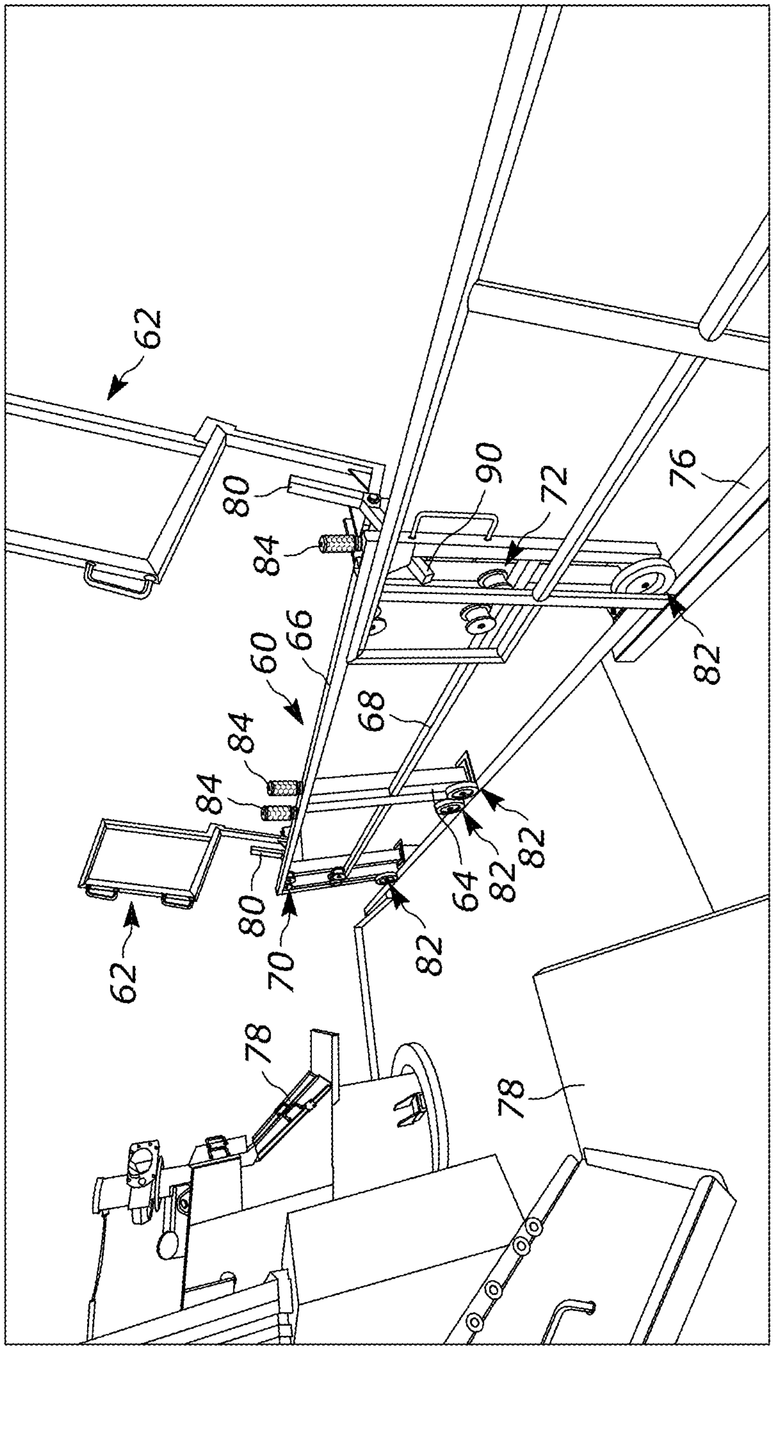
Figure 5G:
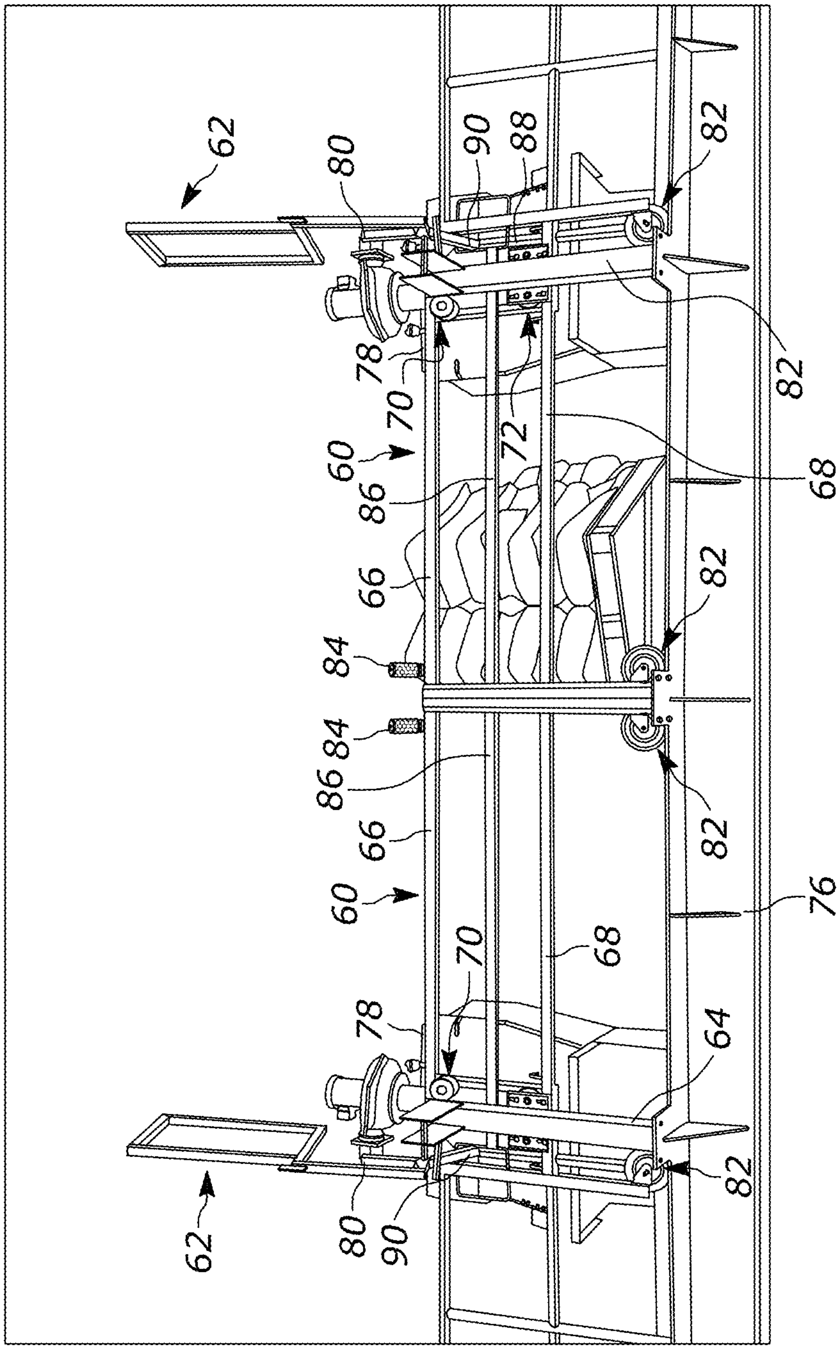

FIGS. 5A-5G show various perspective views of the gate assembly when the forklift gate 60 is closed (e.g., first closed position) and the operator gate is open (e.g., second open position). As best shown in FIGS. 5B, 5D and 5E, the forklift gate 60 includes surfaces defining the notch 92 between the handle 84 and the end of the first horizontal bar 66, wherein the notch 92 provides clearance for the first extension 80 to pass through after the forklift gate 60 has been moved to the first closed position. As best shown in FIGS. 5D and 5E, the forklift gate 60 may include a third horizontal bar 86 and a loop 88 coupled to the third horizontal bar 86. Additionally, the operator gate 62 may further include the second extension 90. In such a case, interference between the interior of the loop 88 and the second extension 90 prevents the forklift gate 60 from sliding from the first closed position to the first open position while the operator gate is in the second open position. FIG. 5F demonstrates that the third horizontal bar 86 may be omitted from the forklift gate 60 (e.g., while maintaining the loop for interference purposes).

Figure 6:
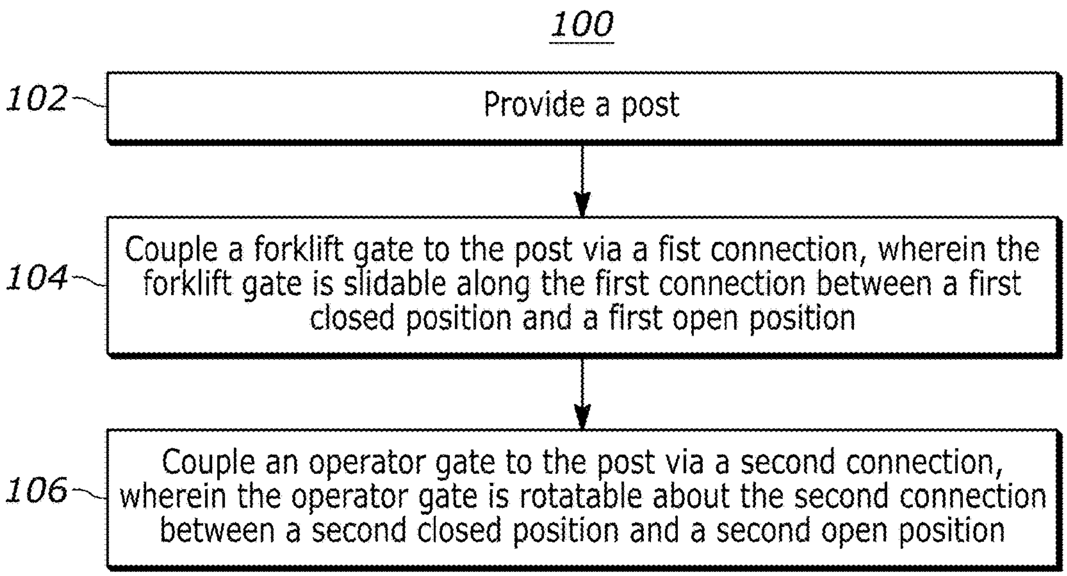
FIG. 6 is a flowchart of an example of a method of manufacturing a gate assembly according to an embodiment.

FIG. 6 shows a method 100 of manufacturing a gate assembly. The method 100 can generally be implemented via manufacturing technology and/or in one or more modules as a set of logic instructions stored in a machine- or computer-readable storage medium such as random access memory (RAM), read only memory (ROM), programmable ROM (PROM), firmware, flash memory, etc., in hardware, or any combination thereof. For example, hardware implementations can include configurable logic, fixed-functionality logic, or any combination thereof. Examples of configurable logic (e.g., configurable hardware) include suitably configured programmable logic arrays (PLAs), field programmable gate arrays (FPGAs), complex programmable logic devices (CPLDs), and general purpose microprocessors. Examples of fixed-functionality logic (e.g., fixed-functionality hardware) include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

Illustrated processing block 102 provides a post, wherein block 104 couples a forklift gate to the post via a first connection. In the illustrated example, the forklift gate is slidable along the first connection between a first closed position and a first open position. Block 106 couples an operator gate to the post via a second connection, wherein the operator gate is rotatable about the second connection between a second closed position and a second open position. In an embodiment, block 106 includes positioning the operator gate in a substantially perpendicular orientation relative to the forklift gate.

As already noted, the forklift gate can include a first horizontal bar and a second horizontal bar, wherein the first connection includes a first plurality of rollers contacting a bottom of the first horizontal bar and a second plurality of rollers contacting a top of the second horizontal bar (e.g., providing a sandwiched configuration to the roller-to-rail interface). Additionally, interference between the first horizontal bar and a first extension of the operator gate can prevent the operator gate from rotating from the second closed position to the second open position while the forklift gate is in the first open position. Moreover, the forklift gate may further include a third horizontal bar and a loop coupled to the third horizontal bar, wherein interference between the loop and a second extension of the operator gate prevents the forklift gate from sliding from the first closed position to the first open position while the operator gate is in the second open position.

Figure 7:
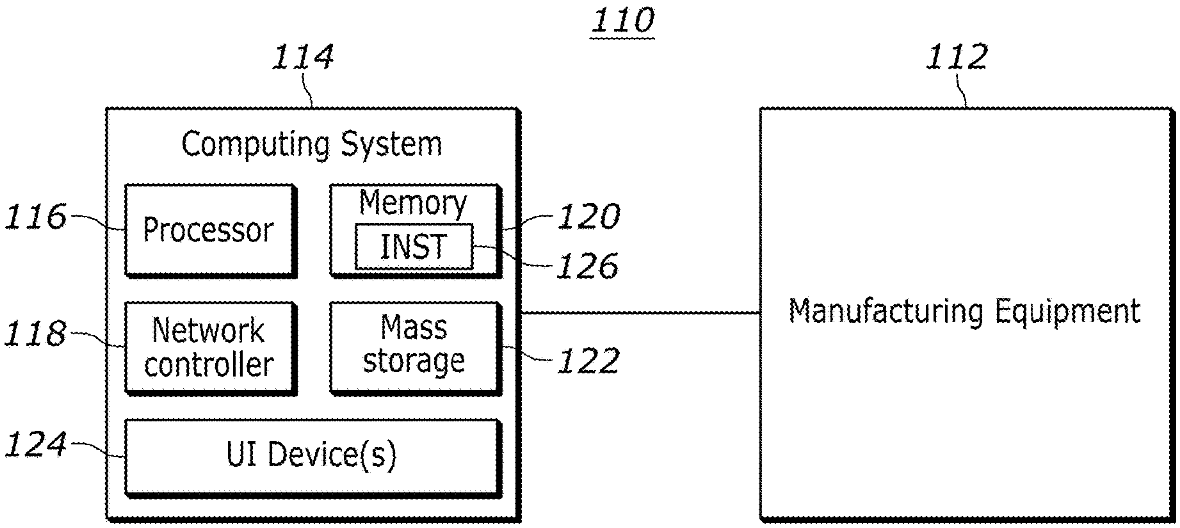
FIG. 7 is a block diagram of an example of a manufacturing system according to an embodiment.

FIG. 7 shows a manufacturing system 110 including manufacturing equipment 112 and a computing system 114 coupled to the manufacturing equipment 112. The illustrated computing system includes a processor 116, a network controller 118, memory 120 (e.g., volatile memory), mass storage 122 and one or more user interface (UI) devices 124. In an embodiment, the processor 116 executes a plurality of instructions 126 retrieved from the memory 120 and/or mass storage 122, wherein execution of the instructions 126 causes the manufacturing equipment 112 to perform one or more aspects of the method 100 (FIG. 7), already discussed.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A gate assembly comprising:

a post;

a forklift gate coupled to the post via a first connection, wherein the forklift gate is slidable along the first connection between a first closed position and a first open position, wherein the forklift gate further includes a third horizontal bar and a loop coupled to the third horizontal bar; and an operator gate coupled to the post via a second connection, wherein the operator gate is rotatable about the second connection between a second closed position and a second open position, wherein interference between the loop and a second extension of the operator gate prevents the forklift gate from sliding from the first closed position to the first open position while the operator gate is in the second open position.

2. The gate assembly of claim 1, wherein the operator gate is positioned in a substantially perpendicular orientation relative to the forklift gate.

3. The gate assembly of claim 1, wherein the forklift gate includes a first horizontal bar and a second horizontal bar, and wherein the first connection includes a first plurality of rollers contacting a bottom of the first horizontal bar and a second plurality of rollers contacting a top of the second horizontal bar.

4. The gate assembly of claim 3, wherein interference between the first horizontal bar and a first extension of the operator gate prevents the operator gate from rotating from the second closed position to the second open position while the forklift gate is in the first open position.

5. The gate assembly of claim 1, wherein the second connection includes a pin.

6. The gate assembly of claim 1, wherein the forklift gate includes a plurality of wheels to contact a platform.

7. A workstation comprising:
- a platform;
- a plurality of bins coupled to the platform; and
- a plurality of gate assemblies coupled to the platform, wherein each gate assembly is positioned adjacent to one of the plurality of bins, and wherein each gate assembly comprises:
  - a post,
  - a forklift gate coupled to the post via a first connection, wherein the forklift gate is slidable along the first connection between a first closed position and a first open position, wherein the forklift gate further includes a third horizontal bar and a loop coupled to the third horizontal bar, and
  - an operator gate coupled to the post via a second connection, wherein the operator gate is rotatable about the second connection between a second closed position and a second open position, wherein interference between the loop and a second extension of the operator gate prevents the forklift gate from sliding from the first closed position to the first open position while the operator gate is in the second open position.

8. The workstation of claim 7, wherein the operator gate is positioned in a substantially perpendicular orientation relative to the forklift gate.

9. The workstation of claim 7, wherein the forklift gate includes a first horizontal bar and a second horizontal bar, and wherein the first connection includes a first plurality of rollers contacting a bottom of the first horizontal bar and a second plurality of rollers contacting a top of the second horizontal bar.

10. The workstation of claim 9, wherein interference between the first horizontal bar and a first extension of the operator gate prevents the operator gate from rotating from the second closed position to the second open position while the forklift gate is in the first open position.

11. The workstation of claim 7, wherein the second connection includes a pin.

12. The workstation of claim 7, wherein the forklift gate includes a plurality of wheels contacting the platform.

13. A method of manufacturing a gate assembly, the method comprising:
- providing a post;
- coupling a forklift gate to the post via a first connection, wherein the forklift gate is slidable along the first connection between a first closed position and a first open position; and
- coupling an operator gate to the post via a second connection, wherein the operator gate is rotatable about the second connection between a second closed position and a second open position, wherein the forklift gate includes a first horizontal bar and a second horizontal bar, wherein the first connection includes a first plurality of rollers contacting a bottom of the first horizontal bar and a second plurality of rollers contacting a top of the second horizontal bar, and wherein interference between the first horizontal bar and a first extension of the operator gate prevents the operator gate from rotating from the second closed position to the second open position while the forklift gate is in the first open position, wherein the forklift gate further includes a third horizontal bar and a loop coupled to the third horizontal bar, and wherein interference between the loop and a second extension of the operator gate prevents the forklift gate from sliding from the first closed position to the first open position while the operator gate is in the second open position.

14. The method of claim 13, further including positioning the operator gate in a substantially perpendicular orientation relative to the forklift gate.

* * * * *